US005533050A

United States Patent [19]
Isard et al.

[11] Patent Number: 5,533,050
[45] Date of Patent: Jul. 2, 1996

[54] SYSTEM FOR RECEIVING A PHASE AND AMPLITUDE MODULATED DIGITAL SIGNAL

[75] Inventors: Marc Isard, Saint Germain en Laye; Thierry Bernier, Maurecourt, both of France

[73] Assignee: Alcatel Telspace, Nanterre Cedex, France

[21] Appl. No.: 260,824

[22] Filed: Jun. 16, 1994

[30] Foreign Application Priority Data

Jun. 17, 1993 [FR] France .................................. 93 07314

[51] Int. Cl.$^6$ .............................. H03H 7/30; H03H 7/40; H03K 5/159; H04L 27/14
[52] U.S. Cl. .......................... 375/229; 375/266; 375/326; 375/350; 332/103
[58] Field of Search ..................................... 375/261, 266, 375/232, 235, 346, 348, 349, 355, 229, 326, 350; 332/103

[56] References Cited

U.S. PATENT DOCUMENTS

| 3,962,637 | 6/1976 | Motley et al. | 375/355 |
| 5,276,711 | 1/1994 | Rossi | 375/355 |
| 5,412,693 | 5/1995 | Bolla et al. | 375/327 |

FOREIGN PATENT DOCUMENTS

0262644A2  5/1988  European Pat. Off. .

OTHER PUBLICATIONS

Jablon, "Joint Blind Equalization, Carrier Recovery and Timing Recovery for High–Order QAM Signal Constellations", *IEEE Transaction of Signal Processing*, vol. 40, No. 6, Jun. 1992, pp. 1383–1397.

Mueller & Muller, "Timing Recovery in Digital Synchronous Data Receivers", *IEEE Transactions on Communications*, vol. 24, No. 5, 1976, pp. 516–531.

*Primary Examiner*—Stephen Chin
*Assistant Examiner*—Don Vo
*Attorney, Agent, or Firm*—Sughrue, Mion, Zinn, Macpeak & Seas

[57] ABSTRACT

A system for receiving a complex modulation digital signal using a temporal equaliser including an estimator supplying correction parameters. This system includes: at least one peripheral control loop, the estimator of which uses at least one of said correction parameters, the peripheral control loop having an operating range separate from that of the temporal equalizer; and a temporal discriminator detecting inactive areas of the estimator of each peripheral control loop to enable operation of the temporal equalizer in such a way as to prevent interaction between the temporal equalizer and the peripheral control loop. The peripheral control loop can be a Mueller and Müller-type pointing estimator and/or a Leclert and Vandamme-type carrier recovery device.

4 Claims, 3 Drawing Sheets

SYSTEM FOR RECEIVING A PHASE AND AMPLITUDE MODULATED DIGITAL SIGNAL

BACKGROUND OF THE INVENTION

The field of the invention is that of systems for receiving complex (phase and amplitude) modulated digital signals using a temporal equalizer. The invention applies to receivers for PDM-M modulated signals and to QAM-M type receivers used in digital radio systems, for example, where the value of M is 4, 8, 16 or greater.

Receiving systems of this kind are described in "Digital Communications" by John G. PROAKIS, McGraw-Hill™.

FIG. 1 shows part of a system for receiving a signal with multiple phases. A received signal x(t) at the intermediate frequency or in the base band is applied to each first input of two mixers 10, 11 the second inputs of which receive local oscillator signals in phase quadrature. These signals are from a 90° phase-shifter 12 receiving a sinusoidal signal from a local oscillator 13. The output signals of the mixers 10, 11 constitute two channels I and Q in phase quadrature and are fed to lowpass filters 14, 15 driving analog-digital converters 18, 19 supplying samples Z, W of the quadrature signals. The samples Z and W are applied to a set 20 of adaptive filters receiving correction parameters from a calculating device 24. The set 20 of filters and the device 24 constitute a temporal equalizer. The set 20 of filters includes four transversal filter branches and drives a signal regenerator 23 supplying regenerated signals X and Y.

The function of a temporal equalizer 20, 24 is to correct all types of linear distortion and therefore to reduce the effect of residual amplitude modulation or group delay time distortion of the transmission system. It is able to eliminate intersymbol interference and fading to minimize the transmission error rate.

The output signals x and y of the temporal equalizer 20, 24 are also fed to a carrier recovery device 21 controlling the local oscillator 13 and to a timing recovery device 22 controlling the analog-digital converters 18 and 19 so that the signals they receive are sampled at the times at which the eye diagram is widest open. The timing recovery device 22 supplies a clock signal H to these converters for this purpose.

The regenerator 23 supplies error signals $e_x$ and $e_y$ to a device 24 for calculating multiplier coefficients supplied to the temporal equalizer 20 (see below) and also to the carrier recovery device 21. The regenerated signals X and Y are also fed to the calculating device 24.

FIG. 2 shows one of the four branches of a set 20 of filters with five coefficients in this example. The input signal E, corresponding to the signal Z or W in FIG. 1, is applied to successive time-delay lines which delay each sample by a time period Ts corresponding to the symbol time. Each sample is multiplied by a coefficient $C_{ES-2}$ to $C_{ES+2}$ supplied to it by the coefficient calculator device 24 (quadrature estimator) and the results of the various multiplications are summed by a summing device 25 whose output signal F corresponds to the estimated sample x or y which is used to optimize the coefficients $C_{ES-2}$ through $C_{ES+2}$. The coefficient $C_{ES0}$ is known as the center coefficient of the filter.

The regenerator 23 converts the received signal into information words and quantifies the distortion of the received signal (x and y) relative to the ideal signal (X and Y). For example, a pointing error $e_0$ on a sample $x_0$ has the following effect:

for pointing anterior to the optimum time:
* $e_0 < 0$ if $x_0 - x_{-1} > 0$ and $x_{+1} - x_0 > 0$
* $e_0 > 0$ if $x_0 - x_{-1} < 0$ and $x_{+1} - x_0 < 0$ for pointing posterior to the optimum time:
* $e_0 > 0$ if $x_0 - x_{-1} > 0$ and $x_{+1} - x_0 > 0$
* $e_0 < 0$ if $x_0 - x_{-1} < 0$ and $x_{+1} - x_0 < 0$ where $x_{-1}$ and $x_{+1}$ respectively correspond to the samples preceding and following the sample $x_0$.

The purpose of the temporal equalizer is to correct distortion between the I and Q channels at the times decisions are taken, i.e. at each symbol time Ts, set by the clock H of the timing recovery device 22, by seeking an orthogonal relationship between the signals x and y.

FIG. 3 shows the set 20 of filters from FIG. 1 in which each branch 30 through 33 can comprise a device as shown in FIG. 2. The respective output signals of the branches 30, 33 and 31, 32 are summed at 34 and 35 to produce the signals x and y.

The orthogonal relationship between x and y is obtained by calculating a matrix of correlation between Z and W and between x and y. This correlation matrix features the center correction parameters $C_{Zx0}$, $C_{Wx0}$, $C_{Zy0}$ and $C_{Wy0}$ which are respectively the center parameters of the filters 30, 31, 32 and 33:

$$\begin{pmatrix} x_0 \\ y_0 \end{pmatrix} = \begin{pmatrix} C_{Zx0} & C_{Wx0} \\ C_{Zy0} & C_{Wy0} \end{pmatrix} \cdot \begin{pmatrix} Z_0 \\ W_0 \end{pmatrix}$$

If pointing of the eye of the signal is not effected at the optimum time by the timing recovery device 22, i.e. when the eye is widest open, the estimated errors $e_x$ and $e_y$ are non-null and the coefficient calculator device 24 attempts to apply a correction by modifying the multiplier parameters of the filter 20 to correct the pointing error. The temporal equalizer and the timing recovery device therefore act in conjunction.

The timing recovery device 22 can operate in various ways and one robust analog synchronization method entails detecting zero crossings of the signals x and y. This detection occurs on the upstream side of quadrature signal sampling and is therefore not protected against thermal drift or bias due to distortion of the received signal x(t) in the case of multipath propagation.

Other known estimators are based on the symmetry of the impulse response to within ± Ts. This type of estimator is described in the article "Timing Recovery in Digital Synchronous Data Receivers", IEEE Transactions on Communications, vol.COM-24 n° 5, May 1976, by Kurt H. Mueller and Markus Müller. It would be desirable if it could be used in the context of the present invention.

However, this type of estimator, referred to hereinafter as the Mueller and Müller type, is not compatible with a temporal equalizer as it is identical to that used by the temporal equalizer.

The estimator of the temporal equalizer included in the coefficient calculator device 24 modifies the first before phase and first after phase coefficients. These coefficients are referred to hereinafter as $C_{\alpha\beta-1}$ and $C_{\alpha\beta+1}$ where α corresponds to Z or W and β to x or y, depending on the branch concerned. These coefficients are denoted $C_{ES+1}$ and $C_{ES-1}$ in FIG. 2 for the filter shown there. The Mueller and Müller article shows that optimization of pointing of the eye diagram amounts to obtaining symmetry between the first before phase and first after phase coefficients. To this end the following error $e_{\alpha\beta}$ is calculated, for example:

$$e_{\alpha\beta} = sgn(x_{+1}) \cdot sgn(e_x) - sgn(x_{-1}) \cdot sgn(e_x)$$

A more general form of the above equation is as follows:

$$e(t)=\gamma(t+\tau)-\gamma(t-\tau)$$

where $\gamma(t+\tau)=\text{sgn}(X_{t+\tau})\cdot\text{sgn}(e_x)$ or $\text{sgn}(x)\cdot\text{sgn}(ex_{t-\tau})$,
and $\gamma(t-\tau)=\text{sgn}(X_{t-\tau})\cdot\text{sgn}(e_x)$ or $\text{sgn}(x)\cdot\text{sgn}(ex_{t+\tau})$,
where sgn( ) corresponds to the sign function and $\tau$ to the time at which the estimate is made. $\tau$ can be equal to 1, for example. The pointing estimator eliminates the error $e_{\alpha\beta}$ to render the impulse response symmetrical.

Consequently, if a temporal equalizer is associated with a Mueller and Müller type pointing estimator, for example, in parallel loops, the receive system as shown in FIG. 1 is rendered unstable. To use a temporal equalizer and a pointing estimator adapted to render the impulse response symmetrical at the same time, it would be necessary to hold at zero the coefficients $C_{Zx-1}$, $C_{Zx+1}$, $C_{Wy-1}$ and $C_{Wy+1}$ of the estimator at zero, the effect of which would be to prevent locking on of the eye diagram pointing. It follows that these two devices are incompatible.

The receive system of FIG. 1 also uses a carrier frequency recovery device 21 which controls the local oscillator 13.

Carrier recovery devices of this kind use known digital estimators. An estimator using the center coefficients $C_{\alpha\beta 0}$ is used, for example, in the so-called Leclert and Vandamme control loops described in the article "Universal Carrier Recovery Loop for QASK and PSK Signal Sets", by A. LECLERT and P. VANDAMME, IEEE TRANSACTIONS ON COMMUNICATIONS, vol. com-31, n° 1, January 1983, pages 130 to 136.

It would be desirable if a Leclert and Vandamme type estimator could be used for carrier recovery in the context of the present invention.

However, interaction also occurs between the estimator of the temporal equalizer and the carrier recovery estimator if the latter uses the center coefficients $C_{\alpha\beta 0}$ of the temporal equalizer. It is then necessary to hold the coefficients $C_{Zy0}$ and $C_{Wx0}$ of the temporal equalizer at zero while the carrier estimator is operating, which prevents quadrature error correction and causes intersymbol distortion.

SUMMARY OF THE INVENTION

A specific object of the present invention is to overcome these drawbacks.

To be more precise, one object of the invention is to provide a system for receiving a complex (phase and amplitude) modulation digital signal using a temporal equalizer to eliminate intersymbol interference and at least one peripheral control loop using at least one of the coefficients employed by the temporal equalizer, without any interaction between the operation of the temporal equalizer and the peripheral control loop.

For example, it must be possible for this peripheral control loop to be a Mueller and Müller type pointing estimator (timing recovery) and/or a Leclert and Vandamme type carrier recovery device.

This objective, and others that emerge below, is achieved by means of a system for receiving a complex modulation digital signal using a temporal equaliser including an estimator supplying correction parameters characterized in that it comprises:
at least one peripheral control loop, the estimator of which uses at least one of the correction parameters supplied to the temporal equalizer, the peripheral control loop having an operating range separate from that of the temporal equalizer;

temporal discriminator means detecting inactive areas of the estimator of each peripheral control loop to enable operation of the temporal equalizer in such a way as to prevent interaction between the temporal equalizer and the peripheral control loop.

It is therefore possible to use at the same time a temporal equalizer and one or more peripheral control loops using estimators similar to that of the temporal equalizer.

In one advantageous embodiment of the invention the peripheral control loop comprises a timing recovery device controlling the phase of a sampling control signal applied to a digital data regenerator device which regenerates data from the temporal equalizer, the timing recovery device including a Mueller and Müller type pointing estimator.

This pointing estimator can be of the type which minimizes the error given by:

$$e(t)=\gamma(t+\tau)-\gamma(t-\tau)$$

where $\gamma(t+\tau)=\text{sgn}(x_{t+\tau})\cdot\text{sgn}(e_x)$ or $\text{sgn}(x)\cdot\text{sgn}(ex_{t-\tau})$,
and $\gamma(t-\tau)=\text{sgn}(x_{t-\tau})\cdot\text{sgn}(e_x)$ or $\text{sgn}(x)\cdot\text{sgn}(ex_{t+\tau})$,
where sgn( ) is the sign function, in which case the temporal discriminator means detect the condition:

$$\gamma(t+\tau)=\gamma(t-\tau)$$

to authorize operation of the temporal equalizer. For example, $\tau$ can be equal to one.

In another embodiment the peripheral control loop is a carrier recovery device controlling the frequency of a local oscillator used to demodulate the digital signal, this carrier recovery device including a Leclert and Vandamme type quadrature estimator whose inactive areas correspond to the active areas of the temporal equalizer and vice versa.

Other features and advantages of the invention will emerge from a reading of the following description of two preferred applications of the invention given by way of non-limiting example only and from the appended drawings in which:

DESCRIPTION OF PREFERRED EMBODIMENTS

Figure 1:
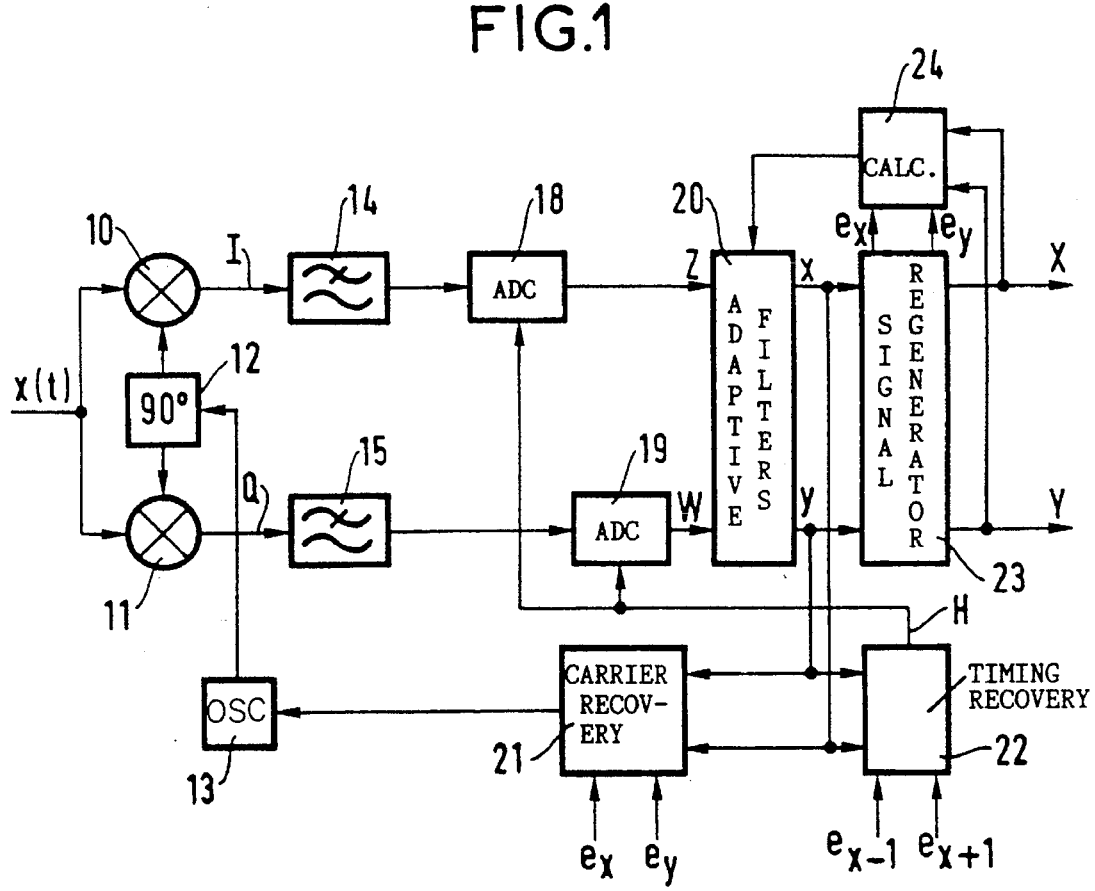
FIG. 1 shows part of a system for receiving a digital signal with multiple phases, this system including a temporal equalizer, a timing recovery device and a carrier recovery device.
Figure 2:
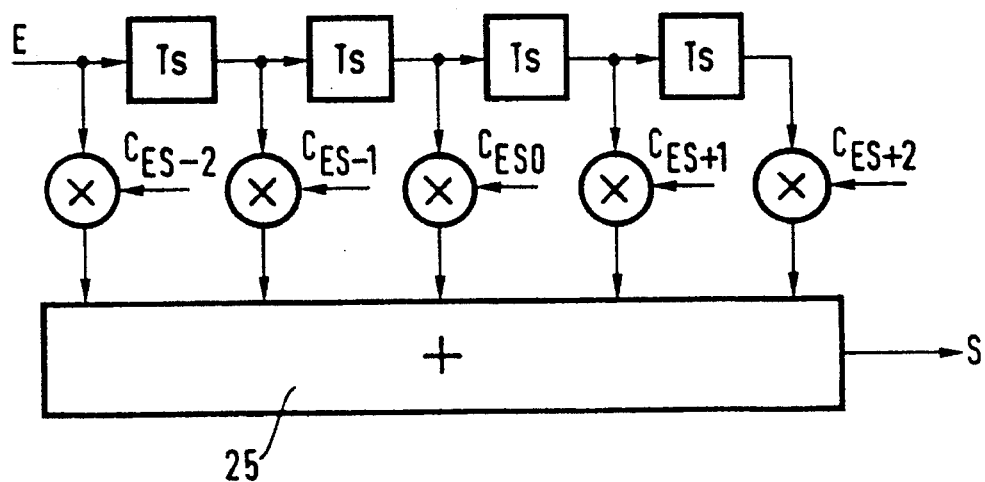
FIG. 2 shows one branch of the set of filters of the temporal equalizer from FIG. 1.
Figure 3:
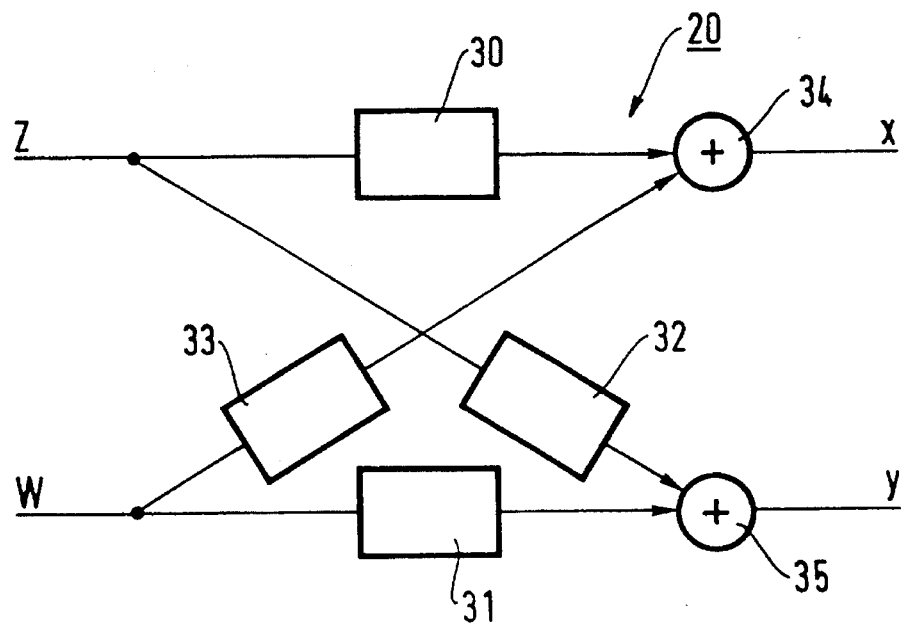
FIG. 3 shows the four branches of the set of filters of the temporal equalizer from FIG. 1.

FIGS. 1 to 3 have been described with reference to the prior art.

The present invention proposes to render a temporal equalizer compatible with a peripheral control loop using at least one of the correction coefficients used in the equalizer, by applying temporal discrimination to their operation. In the remainder of this description the peripheral control loop will comprise firstly a timing recovery device using a Mueller and Müller type pointing estimator and secondly a carrier recovery device using a Leclert and Vandamme type estimator.

Each of these two peripheral control loops uses at least one of the correction parameters $C_{\alpha\beta}$ used by the temporal equalizer, but it is possible to determine time bands in which they do not use these parameters, which then remain available for quadrature control. Obviously other types of peripheral control loop can be used. Generally speaking, any peripheral control loop having a range of operation separate from that of the temporal equalizer can be used.

The following table explains the principle of temporal discrimination used in the present invention when the peripheral control loop is a Mueller and Müller type carrier recovery device, i.e. a control loop adapted to eliminate the error signals $e_x$ and $e_y$ to achieve a symmetrical impulse response.

| $e_{Zx} - 1$ | 0 | 0 | 1 | 1 |
|---|---|---|---|---|
| $e_{Zx} + 1$ | 0 | 1 | 0 | 1 |
| Timing 22 | 0 | −1 | +1 | 0 |
| Equalizer 20 + 24 | Active | Inactive | Inactiv | Active |

This table shows that the calculator device 24 of the temporal equalizer is active (i.e. modifies the coefficients $C_{\alpha\beta-1}$ and $C_{\alpha\beta+1}$) only when the timing recovery device 22 is inactive. The active and inactive areas are therefore complementary. These inactive areas also correspond to the cases where the difference between the errors in question, here the errors on the channel Zx (I channel) before and after the current time, is null and therefore at times when the timing recovery device is not active. The same reasoning applies to the other channel (Q channel; errors $e_{Wy-1}$ and $e_{Zx+1}$).

Detection of these inactive areas thus enables determination of the time bands during which the temporal equalizer can be activated, i.e. time bands during which the coefficients that it shares with the timing recovery function can be modified.

To this end temporal discrimination means can detect a null difference between two elementary correlation products used to calculate the coefficients of the equalizer:

$$Eph = (x_{t+\tau} \cdot ex_t) - (x_{t-\tau} \cdot ex_t)$$

a special case being when $\tau=1$. In this special case:

$$x_{+1} \cdot e_x = e_{Zx+1} \text{ and } x_{-1} \cdot e_x = e_{Zx-1}$$

where $x_{-1}$ and $x_{+1}$ are samples of the signal shifted one symbol time relative to the distortion estimate $e_x$.

Note that the estimator Eph can also be expressed:

$$Eph = (x_t \cdot ex_{t-\tau}) - (x_t \cdot ex_{t+\tau})$$

The phase estimator Eph is neutral if this difference has a null value, i.e. if the detected impulse response appears symmetrical. The use of these elementary terms in control of the temporal equalizer can be restricted only if this neutral area is complied with. This means that the equalization criteria become orthogonal to the pointing criteria and the areas of validity of pointing control and of equalization are entirely separate, which makes the two systems stable and compatible.

Figure 4:
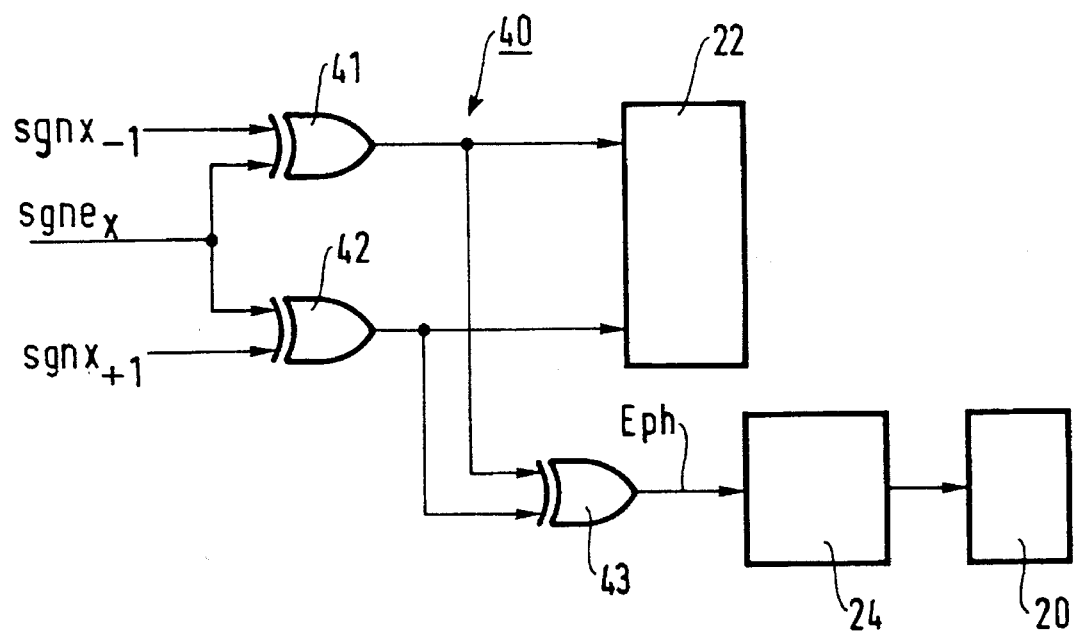
FIG. 4 shows one embodiment of temporal discriminator means used to render a temporal equalizer compatible with a Mueller and Müller type timing recovery device.

FIG. 4 shows one embodiment of these temporal discrimination means.

Three EXCLUSIVE-OR gates 41 to 43 constitute the temporal discrimination means 40 of one channel. The other channel is identical. The gate 41 receives the signs of $x_{-1}$ and $e_x$ and the gate 42 receives the signs of $x_{+1}$ and $e_x$. The outputs of the two gates 41 and 42 are connected to the inputs of the gate 43 whose output signal Eph constitutes a signal enabling the estimator 24 controlling the temporal equalizer 20, 24. When the estimator 24 receives the signal Eph it enables modification of the coefficients $C_{\alpha\beta-1}$ and $C_{\alpha\beta+1}$.

Figures 5, 6, 7:
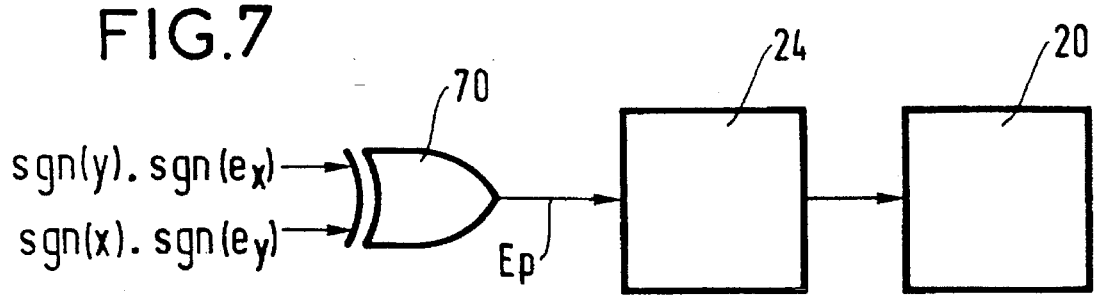
FIG. 5 gives the sign of the quadrature estimator in the recovery plane for a signal with 16 phase states (QAM-16)
FIG. 6 gives the sign of the phase estimator in the recovery plane for a signal with 16 phase states (QAM-16)
FIG. 7 shows one embodiment of temporal discriminator means that can be used when a temporal equalizer and a Leclert and Vandamme type estimator are used in a system for receiving a signal with multiple phases.

With regard to a second possible application of the present invention, FIGS. 5 and 6 respectively give the sign of the quadrature estimator and of the carrier estimator for carrier control in the recovery plane for a signal x(t) with 16 phase states (QAM-16). The carrier control sign for a Leclert and Vandamme type control loop is given by the carrier estimator Ep of the equation:

$$Ep = sgn(y) \cdot sgn(e_x) - sgn(x) \cdot sgn(e_y)$$

In these figures, the inactive ranges, i.e. the states in which the control loops are not modified, are marked zero while the ranges in which the control loops are modified are marked − or +. Note that the carrier and quadrature control loops are orthogonal, i.e. they are never activated at the same time and are complementary, as previously. Thus, by detecting the activity of the carrier recovery estimator, it is possible to inhibit modification of the quadrature estimator parameters. To this end temporal discriminator means such as those shown in FIG. 7 can be used.

FIG. 7 shows one embodiment of temporal discriminator means that can be used when a temporal estimator and a Leclert and Vandamme type estimator are used in a system for receiving a signal with multiple phases.

These temporal discriminator means comprise an EXCLUSIVE-OR gate 70 receiving at its inputs the signals $sgn(y) \cdot sgn(e_x)$ and $sgn(x) \cdot sgn(e_y)$. They supply the sign Ep to the quadrature estimator 24 controlling the temporal equalizer 20, this sign preventing modification of the quadrature center coefficients of the temporal equalizer if the carrier recovery device is active.

The center coefficients of the equalizer 20 are operative only on the quadrature when they are active, i.e. if the carrier estimator is in the inactive area. This eliminates interaction between the carrier recovery device and quadrature control loop.

Generally speaking, the invention proposes temporal discriminator means detecting the inactive areas of a peripheral control loop to enable operation of the temporal equalizer of the receive system, to prevent interaction between the temporal equalizer and the peripheral control loop concerned.

The invention applies to any type of quadrature estimator. Also, a plurality of peripheral control loops can be used simultaneously: for example, a Mueller and Müller type timing recovery device can be used at the same time as a Leclert and Vandamme type carrier recovery device and a temporal equalizer.

We claim:

1. A system for receiving a complex modulation digital signal (x(t)) using a temporal equalizer (20, 24) for receiving said signal and including an estimator (24) supplying correction parameters ($C_{\alpha\beta}$), characterized in that it comprises:

at least one peripheral control loop (21, 22), the estimator of which uses at least one of said correction parameters ($C_{\alpha\beta}$) supplied to said temporal equalizer (20, 24), said peripheral control loop (21, 22) having an operating range separate from that of said temporal equalizer (20, 24); and temporal discriminator means (40, 70) coupled to, and detecting inactive areas of, the estimator of each peripheral control loop (21, 22) to enable operation of said temporal equalizer (20, 24) in such a way as to prevent interaction between said temporal equalizer (20, 24) and said peripheral control loop (21, 22).

2. System according to claim 1 characterized in that said peripheral control loop comprises a timing recovery device (22) controlling the phase of a sampling control signal (H) applied to a device (23) for regenerating digital data (x, y) from said temporal equalizer (20, 24), said timing recovery device (22) including a Mueller and Müller type pointing estimator.

3. System according to claim 2 characterized in that said pointing estimator minimizes the error given by:

$$e(t) = \gamma(t+\tau) - \gamma(t-\tau)$$

where $\gamma(t+\tau) = \text{sgn}(x_{t+\tau}) \cdot \text{sgn}(e_x)$ or $\text{sgn}(x) \cdot \text{sgn}(ex_{t-\tau})$, and $\gamma(t-\tau) = \text{sgn}(x_{t-\tau}) \cdot \text{sgn}(e_x)$ or $\text{sgn}(x) \cdot \text{sgn}(ex_{t+\tau})$, where sgn( ) is the sign function, and in that said temporal discriminator means detect the condition:

$$\gamma(t+\tau) = \gamma(t-\tau)$$

to enable operation of said temporal equalizer (20, 24).

4. System according to claim 1 characterized in that said peripheral control loop comprises a carrier recovery device (21) controlling the frequency of a local oscillator (13) used to demodulate said digital signal (x(t)), said carrier recovery device (21) including a Leclert and Vandamme type quadrature estimator the inactive areas of which correspond to active areas of said temporal equalizer (20, 24).

* * * * *